US012680502B2

(12) United States Patent
Gignac et al.

(10) Patent No.: US 12,680,502 B2
(45) Date of Patent: Jul. 14, 2026

(54) STRAINER ASSEMBLY FOR AN AIRCRAFT ENGINE OIL SYSTEM

(71) Applicant: Pratt & Whitney Canada Corp., Longueuil (CA)

(72) Inventors: Stephane Gignac, Boucherville (CA); Marion Daniel, Verdun (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/896,478

(22) Filed: Sep. 25, 2024

(65) Prior Publication Data

US 2026/0085631 A1      Mar. 26, 2026

(51) Int. Cl.
F02C 7/06          (2006.01)

(52) U.S. Cl.
CPC .......... F02C 7/06 (2013.01); F05D 2220/323 (2013.01); F05D 2260/98 (2013.01)

(58) Field of Classification Search
CPC .. F02C 7/06; F05D 2220/323; F05D 2260/98; F01M 1/10
USPC ........................................ 184/6.11
See application file for complete search history.

(56) References Cited

U.S. PATENT DOCUMENTS

| | | | | |
|---|---|---|---|---|
| 3,592,768 | A | * | 7/1971 | Parker ..................... F16L 55/24 |
| | | | | 210/495 |
| 5,139,673 | A | * | 8/1992 | Martin ................... B01D 29/96 |
| | | | | 55/525 |
| 5,536,402 | A | | 7/1996 | Kluhsman |
| 5,862,667 | A | * | 1/1999 | Prince ....................... F02C 7/22 |
| | | | | 60/734 |
| 6,955,266 | B2 | * | 10/2005 | Ballet .................. B01D 29/668 |
| | | | | 210/433.1 |
| 7,243,742 | B2 | | 7/2007 | Kutryk |
| 7,530,228 | B2 | | 5/2009 | Martin |
| 8,083,940 | B2 | * | 12/2011 | Durocher ............... B01D 35/02 |
| | | | | 210/232 |

(Continued)

FOREIGN PATENT DOCUMENTS

| | | |
|---|---|---|
| CN | 212252045 U | 12/2020 |
| CN | 212744114 U | 3/2021 |

(Continued)

OTHER PUBLICATIONS

EP Search Report for EP Patent Application No. 25204774.1 dated Feb. 13, 2026.

*Primary Examiner* — Robert W Hodge
*Assistant Examiner* — Mark K Buse
(74) *Attorney, Agent, or Firm* — Getz Balich LLC

(57)          ABSTRACT

An engine oil system includes a conduit and a strainer assembly. The conduit forms a portion of an oil flow path. The conduit includes a first conduit body and a second conduit body. The first conduit body is mounted to the second conduit body at a flange interface. The first conduit body and the second conduit body form an internal passage of the conduit. The strainer assembly is disposed within the conduit at the flange interface. The strainer assembly includes a tubular body, a first packing ring, a second packing ring, and a strainer member. The first packing ring forms a first fluid seal between the tubular body and the first conduit body. The second packing ring forms a second fluid seal between the tubular body and the second conduit body. The strainer member is mounted to the tubular body within the oil flow path.

20 Claims, 7 Drawing Sheets

(56)         References Cited

U.S. PATENT DOCUMENTS

| | | | |
|---|---|---|---|
| 8,534,467 | B2 | 9/2013 | Haas |
| 11,224,830 | B2 * | 1/2022 | Wildermuth ........... B01D 29/96 |
| 11,944,929 | B2 | 4/2024 | Beaulieu |
| 2011/0265438 | A1 | 11/2011 | Ryan |
| 2017/0036144 | A1 * | 2/2017 | Jacquerie .................. B03C 1/30 |
| 2020/0289965 | A1 * | 9/2020 | Hochstetler ........... B01D 35/30 |
| 2023/0060048 | A1 * | 2/2023 | Martin ................ F16H 57/0479 |
| 2024/0200477 | A1 | 6/2024 | Gignac |

FOREIGN PATENT DOCUMENTS

| | | | |
|---|---|---|---|
| CN | 114053771 | B | 1/2023 |
| CN | 218409506 | U | 1/2023 |
| CN | 111846254 | B | 12/2024 |
| EP | 4047244 | B1 | 11/2023 |
| WO | 2013117716 | A1 | 8/2013 |

* cited by examiner

STRAINER ASSEMBLY FOR AN AIRCRAFT ENGINE OIL SYSTEM

TECHNICAL FIELD

This disclosure relates to engine oil systems for aircraft engines.

BACKGROUND OF THE ART

Engines for aircraft may typically include rotational equipment configured for facilitating aircraft propulsion, generating electrical power, and/or other functions of aircraft operation. In many cases, rotational equipment may require lubrication and/or cooling, for example, using one or more oil systems to distribute oil to the rotational equipment and/or other oil loads. Various engine oil systems are known in the art. While these known systems may be useful for their intended purposes, there is always room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an engine oil system for an aircraft engine includes a conduit and a strainer assembly. The conduit forms a portion of an oil flow path through the engine oil system. The conduit includes a first conduit body and a second conduit body. The first conduit body is mounted to the second conduit body at a flange interface. The first conduit body and the second conduit body form an internal passage of the conduit for the oil flow path. The strainer assembly is disposed within the conduit at the flange interface. The strainer assembly includes a tubular body, a first packing ring, a second packing ring, and a strainer member. The tubular body further forms the internal passage. The first packing ring forms a first fluid seal between the tubular body and the first conduit body. The second packing ring forms a second fluid seal between the tubular body and the second conduit body. The first packing ring and the second packing ring isolate the flange interface from fluid communication with the internal passage. The strainer member is mounted to the tubular body within the oil flow path.

In any of the aspects or embodiments described above and herein, the engine oil system may further include an oil tank and an oil pump, and the conduit forms the portion of the oil flow path between the oil tank and the oil pump.

In any of the aspects or embodiments described above and herein, the first conduit body may include a first flange portion, the second conduit body may include a second flange portion, and the first flange portion may be mounted to the second flange portion to form the flange interface.

In any of the aspects or embodiments described above and herein, the strainer member may extend between and to a first strainer end and a second strainer end, the strainer member may be mounted to the tubular body and the first strainer end, and the second strainer end may be disposed within the second conduit body.

In any of the aspects or embodiments described above and herein, the strainer member may have a conical body having a diameter which converges in a direction from the first strainer end toward the second strainer end.

In any of the aspects or embodiments described above and herein, the tubular body may extend along an axis of the strainer assembly between and to a first axial end and a second axial end, the first axial end may be disposed within the first conduit body, and the second axial end may be disposed within the second conduit body.

In any of the aspects or embodiments described above and herein, the tubular body may form the internal passage through the flange interface.

In any of the aspects or embodiments described above and herein, the first packing ring may be disposed at the first axial end.

In any of the aspects or embodiments described above and herein, the second packing ring may be disposed at the second axial end.

In any of the aspects or embodiments described above and herein, the tubular body may extend along an axis of the strainer assembly between and to a first axial end and a second axial end, the first axial end may be disposed within the first conduit body, and the second axial end may be disposed at the flange interface.

In any of the aspects or embodiments described above and herein, the second conduit body may include a tubular extension disposed within the tubular body.

In any of the aspects or embodiments described above and herein, the second packing ring may form the second fluid seal between the tubular body and the tubular extension.

According to another aspect of the present disclosure, an engine oil system for an aircraft engine includes a conduit and a strainer assembly. The conduit forms a portion of an oil flow path through the engine oil system. The conduit includes a first conduit body and a second conduit body. The first conduit body is mounted to the second conduit body at a flange interface. The first conduit body and the second conduit body form an internal passage of the conduit for the oil flow path. The strainer assembly is disposed within the conduit at the flange interface. The strainer assembly includes a tubular body, a first packing ring, a second packing ring, and a strainer member. The tubular body extends between and to a first axial end and a second axial end. The tubular body further forms the internal passage between the first axial end and the second axial end. The first axial end is disposed within the first conduit body. The second axial end is disposed at the second conduit body. The first packing ring and the second packing ring are disposed at the tubular body and isolate the flange interface from fluid communication with the internal passage. The strainer member is mounted to the tubular body within the oil flow path.

In any of the aspects or embodiments described above and herein, the first conduit body may include a first flange portion, the second conduit body may include a second flange portion, and the first flange portion may be mounted to the second flange portion to form the flange interface between the first flange portion and the second flange portion.

In any of the aspects or embodiments described above and herein, the first packing ring may form a first fluid seal between the tubular body and the first conduit body.

In any of the aspects or embodiments described above and herein, the second packing ring may form a second fluid seal between the tubular body and the second conduit body.

In any of the aspects or embodiments described above and herein, the tubular body may be disposed radially inward of the second packing ring and the second conduit body may be disposed radially outward of the second packing ring.

In any of the aspects or embodiments described above and herein, the tubular body may be disposed radially outward of the second packing ring and the second conduit body may be disposed radially inward of the second packing ring.

In any of the aspects or embodiments described above and herein, the strainer member may extend between and to a first strainer end and a second strainer end, the strainer member may be mounted to the tubular body and the first strainer end, and the second strainer end may be disposed within the second conduit body.

In any of the aspects or embodiments described above and herein, the strainer member may have a conical body having a diameter which converges in a direction from the first strainer end toward the second strainer end.

The present disclosure, and all its aspects, embodiments and advantages associated therewith will become more readily apparent in view of the detailed description provided below, including the accompanying drawings.

DETAILED DESCRIPTION

Figure 1:
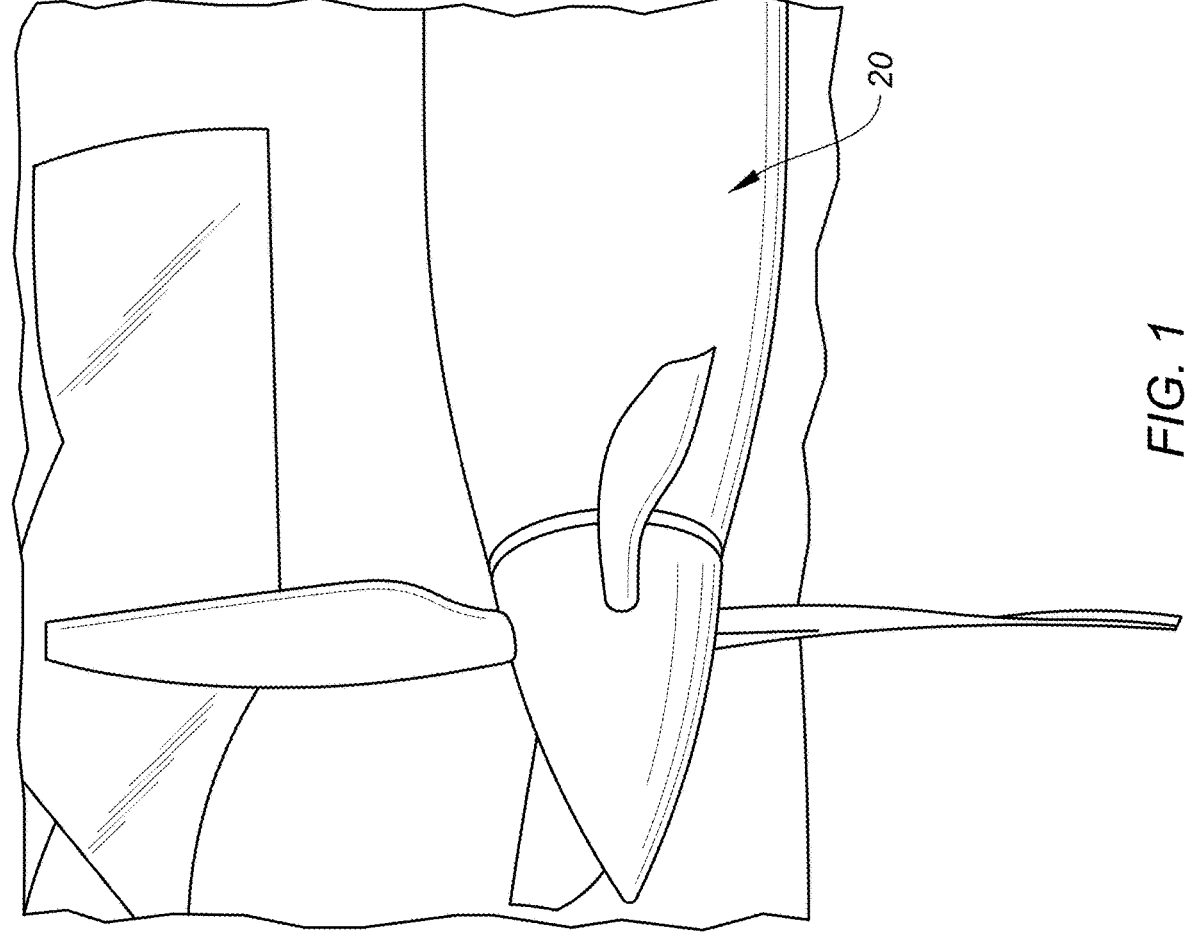
FIG. 1 illustrates a perspective view of an aircraft including a propulsion system, in accordance with one or more embodiments of the present disclosure.

FIG. 1 illustrates a propulsion system 20 for an aircraft. Briefly, the aircraft may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV, e.g., a drone).

Figure 2:
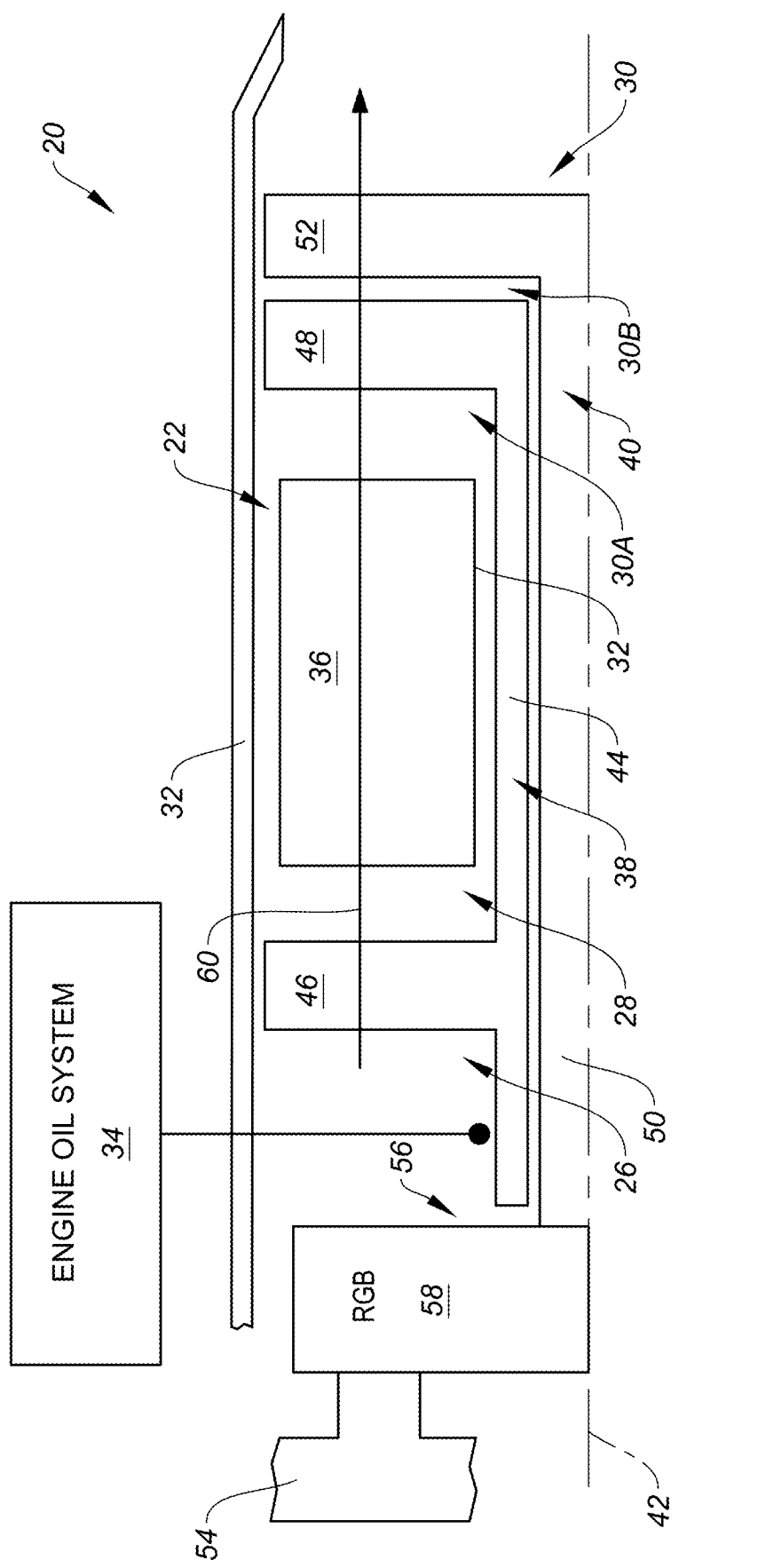
FIG. 2 schematically illustrates a cutaway, side view of an aircraft propulsion system including a gas turbine engine, in accordance with one or more embodiments of the present disclosure.

FIG. 2 schematically illustrates a cutaway, side view of the propulsion system 20. The propulsion system 20 of FIG. 2 includes a gas turbine engine 22. The gas turbine engine 22 of FIG. 2 is configured as a turboprop gas turbine engine. However, while the following description and accompanying drawings may refer to the turboprop gas turbine engine 22 of FIG. 2 as an example, it should be understood that aspects of the present disclosure may be equally applicable to other types of gas turbine engines including, but not limited to, a turboshaft gas turbine engine, a turbofan gas turbine engine, a turbojet gas turbine engine, a propfan gas turbine engine, or an open rotor gas turbine engine. Aspects of the present disclosure may be equally applicable to aircraft propulsion systems including other engine configurations such as, but not limited to, rotary engines, piston engines, and the like, or to electric aircraft propulsion systems (e.g., battery-electric propulsion systems, fuel-cell-electric propulsion systems, etc.). Aspects of the present disclosure may also be equally applicable to aircraft engines which are not part of a propulsion system, for example, an engine for an auxiliary power unit (APU).

The gas turbine engine 22 of FIG. 2 includes a compressor section 26, a combustor section 28, a turbine section 30, an engine static structure 32, and an engine oil system 34. The combustor section 28 includes a combustor 36 (e.g., an annular combustor). The turbine section 30 of FIG. 2 includes a high-pressure turbine (HPT) section 30A and a low-pressure turbine (LPT) section 30B.

Components of the compressor section 26 and/or the turbine section 30 form a first rotational assembly 38 (e.g., a high-pressure spool) and a second rotational assembly 40 of the gas turbine engine 22. The first rotational assembly 38 and the second rotational assembly 40 are mounted for rotation about a rotational axis 42 (e.g., an axial centerline) of the gas turbine engine 22 relative to the engine static structure 32.

The first rotational assembly 38 includes a first shaft 44, a bladed compressor rotor 46 for the compressor section 26, and a bladed first turbine rotor 48 for the high-pressure turbine section 30A. The first shaft 44 interconnects the bladed first compressor rotor 46 and the bladed first turbine rotor 48.

The second rotational assembly 40 includes a second shaft 50 and a bladed second turbine rotor 52 (e.g., a power turbine rotor) for the low-pressure turbine section 30B. The second shaft 50 is connected to the bladed second turbine rotor 52. The second shaft 50 couples the bladed second turbine rotor 52 with a propulsor 54 (e.g., a propeller) of the propulsor system 20. The second shaft 50 of FIG. 2 is coupled to the propulsor 54 by a gear train 56. For example, the gear train 56 of FIG. 2 includes a reduction gear box (RGB) 58 including a gear assembly (e.g., an epicyclic gear assembly) configured to drive the propulsor 54 at a reduced rotational speed relative to the second shaft 50. Alternatively, the second shaft 50 may be directed coupled to the propulsor 54 to drive the propulsor 54 at a same rotational speed as the second shaft 50.

The engine static structure 32 includes one or more engine cases, cowlings, inner fixed structures, and/or other non-rotating structures configured to house and/or support components of the gas turbine engine sections 26, 28, 30. The engine static structure 32 further includes one or more bearing assemblies configured to rotationally support components of the first rotational assembly 38 and the second rotational assembly 40.

In operation of the gas turbine engine 22, ambient air is directed into (e.g., from an air intake) and through the compressor section 26 along a core flow path 60. Air flow along the core flow path 60 is compressed in the compressor section 26, mixed and burned with fuel in the combustor 36, and the resultant combustion gas is directed through the high-pressure turbine section 30A and the low-pressure turbine section 30B. The bladed first turbine rotor 48 and the bladed second turbine rotor 52 rotationally drive the first rotational assembly 38 and the second rotational assembly 40, respectively, in response to the combustion gas flow through the high-pressure turbine section 30A and the low-pressure turbine section 30B. The second rotational assembly 40 drives rotation of the propulsor 54 to generate thrust for the propulsion system 20.

Figure 3:
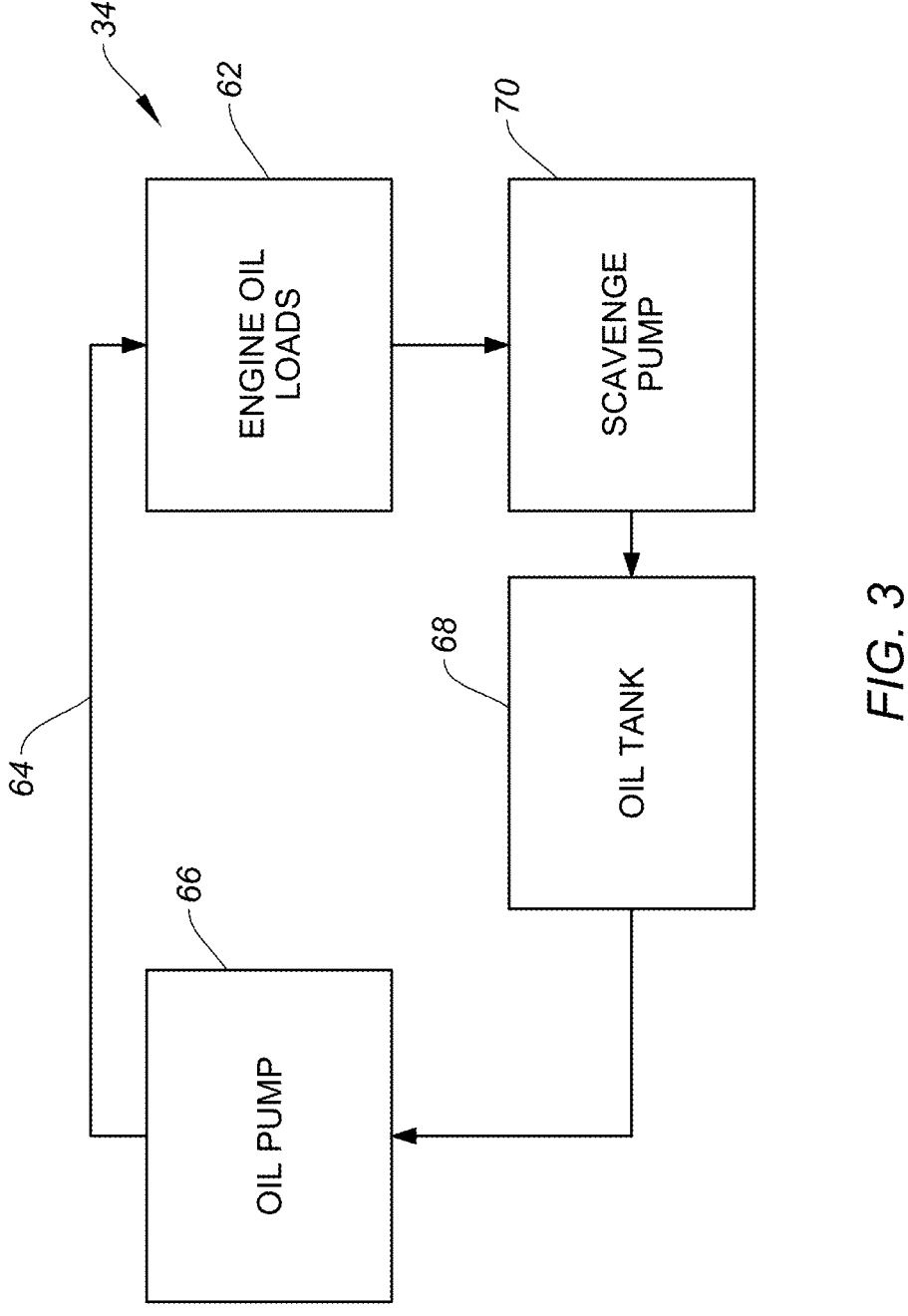
FIG. 3 schematically illustrates an engine oil system for an aircraft propulsion system, in accordance with one or more embodiments of the present disclosure.

Referring to FIG. 3, the engine oil system 34 is configured to facilitate lubrication and/or cooling for components of the propulsion system 20 and its gas turbine engine 22. FIG. 3 schematically illustrates the engine oil system 34. The present disclosure is not limited to the foregoing exemplary configuration of the engine oil system 34 of FIG. 3, and the engine oil system 34 may include additional and/or alternative oil system components (e.g., tanks, valves, heat exchangers, pumps, conduits, regulators, etc.) suitable for facilitating lubrication and/or cooling for components of the propulsion system 20 and its gas turbine engine 22, referred to herein as engine oil loads 62. The engine oil loads 62 may include, but are not limited to, bearing assemblies, gear train 56 components (e.g., the reduction gear box 58), shafts (e.g., the first shaft 44 and the second shaft 50), and the like.

The engine oil system 34 includes an oil flow path 64, an oil pump 66, and an oil tank 68. The engine oil system 34 may additionally include one or more scavenge pumps 70. The oil pump 66 is configured to circulate oil from the oil tank 68 along the oil flow path 64 to direct (e.g., pump) the oil to the engine oil loads 62 for lubrication and/or cooling of the engine oil loads 62. Oil from the engine oil loads 62 is directed to return to the oil tank 68. For example, the scavenge pump 70 may operate to direct (e.g., pump) oil from one or more of the engine oil loads 62, or an oil sump downstream of the engine oil loads 62, to the oil tank 68.

Figure 4:
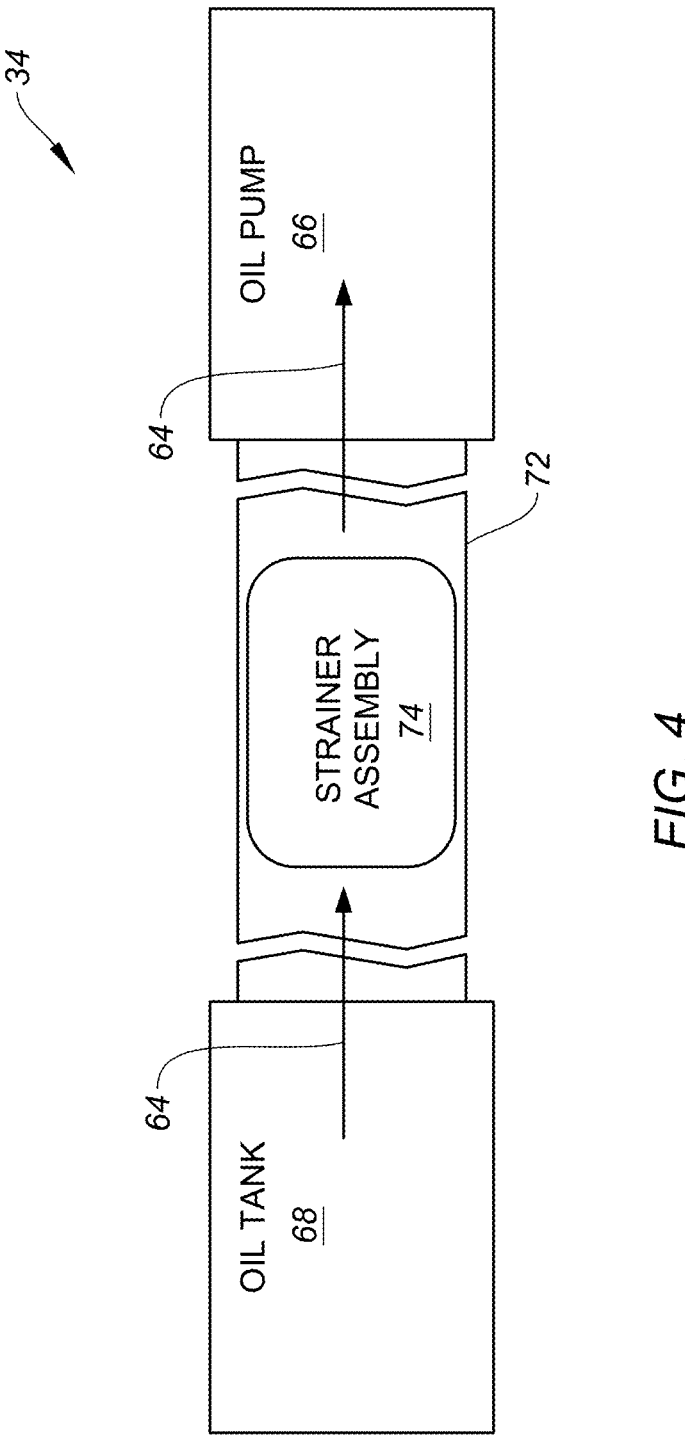
FIG. 4 schematically illustrates a portion of the engine oil system including a strainer assembly, in accordance with one or more embodiments of the present disclosure.

FIG. 4 schematically illustrates a portion of the engine oil system 34 including a conduit 72 and a strainer assembly 74. The conduit 72 interconnects the oil tank 68 in fluid communication with the oil pump 66. The strainer assembly 74 is disposed within the conduit 72 such that all or substantially all oil flow along the oil flow path 64 from the oil tank 68 to the oil pump 66 is directed through the strainer assembly 74. While the conduit 72 and the strainer assembly 74 are described herein and shown in FIG. 4 between the oil tank 68 and the oil pump 66, the conduit 72 and the strainer assembly 74 may alternatively be arranged at other points along the oil flow path 64, and the present disclosure is not limited to the particular conduit 72 and strainer assembly 74 arrangement of FIG. 4. The strainer assembly 74 is configured to remove debris from the oil flowing along the oil flow path 64 before the oil is supplied to the engine oil loads 62, which debris may cause damage to the engine oil loads 62 or otherwise degrade their operation. Because the strainer assembly 74 is configured to be installed within the conduit 72, visual verification of the proper installation of the strainer assembly 74 may not be possible without disassembling components of the engine oil system 34 and, in some cases, the gear train 56 (see FIG. 2).

Figure 5:
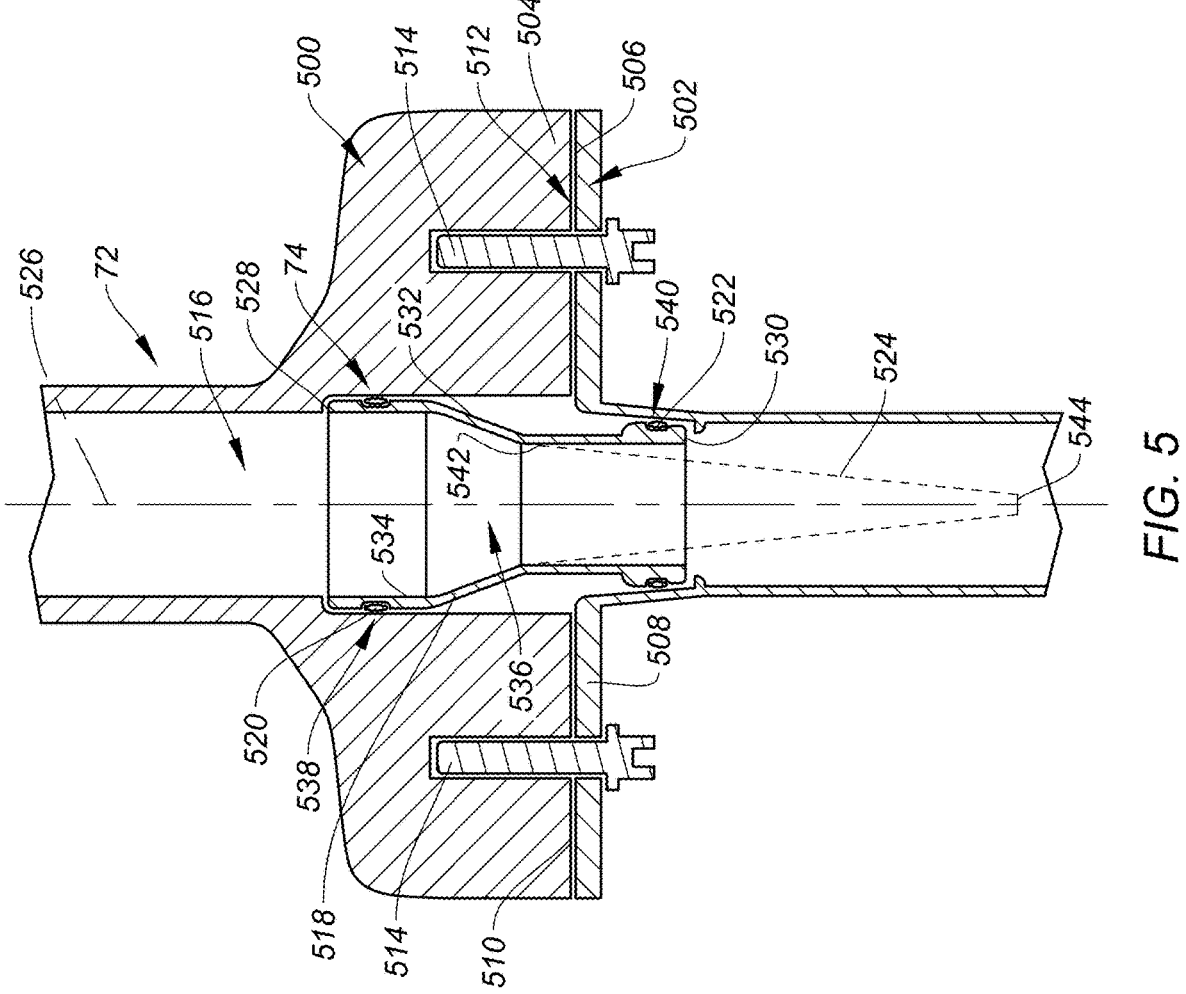
FIG. 5 illustrates a cutaway view of the engine oil system and a strainer assembly, in accordance with one or more embodiments of the present disclosure.

FIG. 5 illustrates a cutaway view of an embodiment of the strainer assembly 74 installed in the conduit 72. The conduit 72 of FIG. 5 includes a first conduit body 500 (e.g., a pipe) and a second conduit body 502 (e.g., a pipe). The first conduit body 500 of FIG. 5 includes a flange portion 504 at (e.g., on, adjacent, or proximate) an end 506 (e.g., a distal end) of the first conduit body 500. The second conduit body 502 of FIG. 5 includes a flange portion 508 at (e.g., on, adjacent, or proximate) an end 510 (e.g., a distal end) of the second conduit body 502. The first conduit body 500 (e.g., the flange portion 504) is mounted to the second conduit body 502 (e.g., the flange portion 508) along a flange interface 512, for example, by a plurality of mechanical fasteners 514. The first conduit body 500 and the second conduit body 502 form an internal passage 516 of the conduit 72 through which oil may flow along the oil flow path 64 in a direction from the first conduit body 500 to the second conduit body 502. The strainer assembly 74 of FIG. 5 is mounted within the first conduit body 500 and the second conduit body 502 at (e.g., on, adjacent, or proximate) the flange interface 512. The strainer assembly 74 of FIG. 5 includes a tubular body 518, a first packing ring 520, a second packing ring 522, and a strainer member 524 arranged along an axis 526 (e.g., a centerline axis) of the strainer assembly 74 of FIG. 5.

The tubular body 518 extends circumferentially about (e.g., completely around) the axis 526. The tubular body 518 extends (e.g., axially extends) between and to a first axial end 528 of the tubular body 518 and a second axial end 530 of the tubular body 518. The tubular body 518 extends (e.g., radially extends) between and to an outer radial side 532 of the tubular body 518 and an inner radial side 534 of the tubular body 518. The tubular body 518 extends through (e.g., axially through) the flange interface 512 such that the first axial end 528 is disposed within the first conduit body 500 and the second axial end 530 is disposed within the second conduit body 502. The inner radial side 534 forms and circumscribes a strainer passage 536 of the tubular body 518. The strainer passage 536 extends through the tubular body 518 from the first axial end 528 (e.g., an inlet end of the strainer passage 536) to the second axial end 530 (e.g., an outlet end of the strainer passage 536). The strainer passage 536 forms a portion of the internal passage 516, which portion extends through (e.g., axially through) the flange interface 512. Accordingly, oil along the oil flow path 64 flows through the internal passage 516 from the first conduit body 500, through the tubular body 518 (e.g., the strainer passage 536), and into the second conduit body 502.

The first packing ring 520 extends circumferentially about (e.g., completely around) the axis 526. The first packing ring 520 is disposed on the outer radial side 532, for example, at (e.g., on, adjacent, or proximate) the first axial end 528. The first packing ring 520 of FIG. 5 is disposed within a packing groove 538 formed by the tubular body 518 on the outer radial side 532. The first packing ring 520 is disposed in contact with the first conduit body 500 to form a fluid seal between the tubular body 518 and the first conduit body 500 upstream of the flange interface 512.

The second packing ring 522 extends circumferentially about (e.g., completely around) the axis 526. The second packing ring 522 is disposed on the outer radial side 532, for example, at (e.g., on, adjacent, or proximate) the second axial end 530. The second packing ring 522 of FIG. 5 is disposed within a packing groove 540 formed by the tubular body 518 on the outer radial side 532. The second packing ring 522 is disposed in contact with the second conduit body 502 to form a fluid seal between the tubular body 518 and the second conduit body 502 downstream of the flange interface 512. The first packing ring 520 and the second packing ring 522 collectively isolate the internal passage 516 from fluid communication with the flange interface 512. While the packing rings 520, 522 of FIG. 5 are disposed within the grooves 538, 540 formed by the tubular body 518, one or both of the packing rings 520, 522 may alternatively be disposed in a respective groove formed by the first conduit body 500 or the second conduit body 502.

The strainer member 524 extends circumferentially about (e.g., completely around) the axis 526. The strainer member 524 extends (e.g., axially extends) between and to a first axial end 542 of the strainer member 524 and a second axial end 544 of the strainer member 524. The strainer member 524 is mounted to the tubular body 518 at (e.g., on, adjacent, or proximate) the first axial end 542. For example, the first axial end 542 may be brazed to, welded to, or otherwise fixedly attached to the tubular body 518 on the inner radial side 534. The second axial end 544 is disposed downstream of the first axial end 542. For example, the second axial end 544 may be disposed within the second conduit body 502 and form a distal, downstream end of the strainer assembly 74. In some alternative embodiments, however, the second axial end 544 may be disposed upstream of the first axial end 542 (e.g., to accommodate space constraints within the conduit 72). The strainer member 524 may include a mesh or otherwise perforated strainer plate extending circumferentially about the axis 526 between and to the first axial end 542 and the second axial end 544. The strainer member 524 is configured to strain debris entrained in the oil (e.g., all or substantially all of the oil flowing through the internal passage 516) such that the debris is removed from the oil as the oil flows through the strainer 524 along the oil flow path 64. The strainer member 524 of FIG. 5 forms a conical body having a diameter which converges in a direction from the first axial end 542 toward the second axial end 544; however, the present disclosure is not limited to the foregoing exemplary configuration of the strainer member 524 of FIG. 5.

Figure 6:
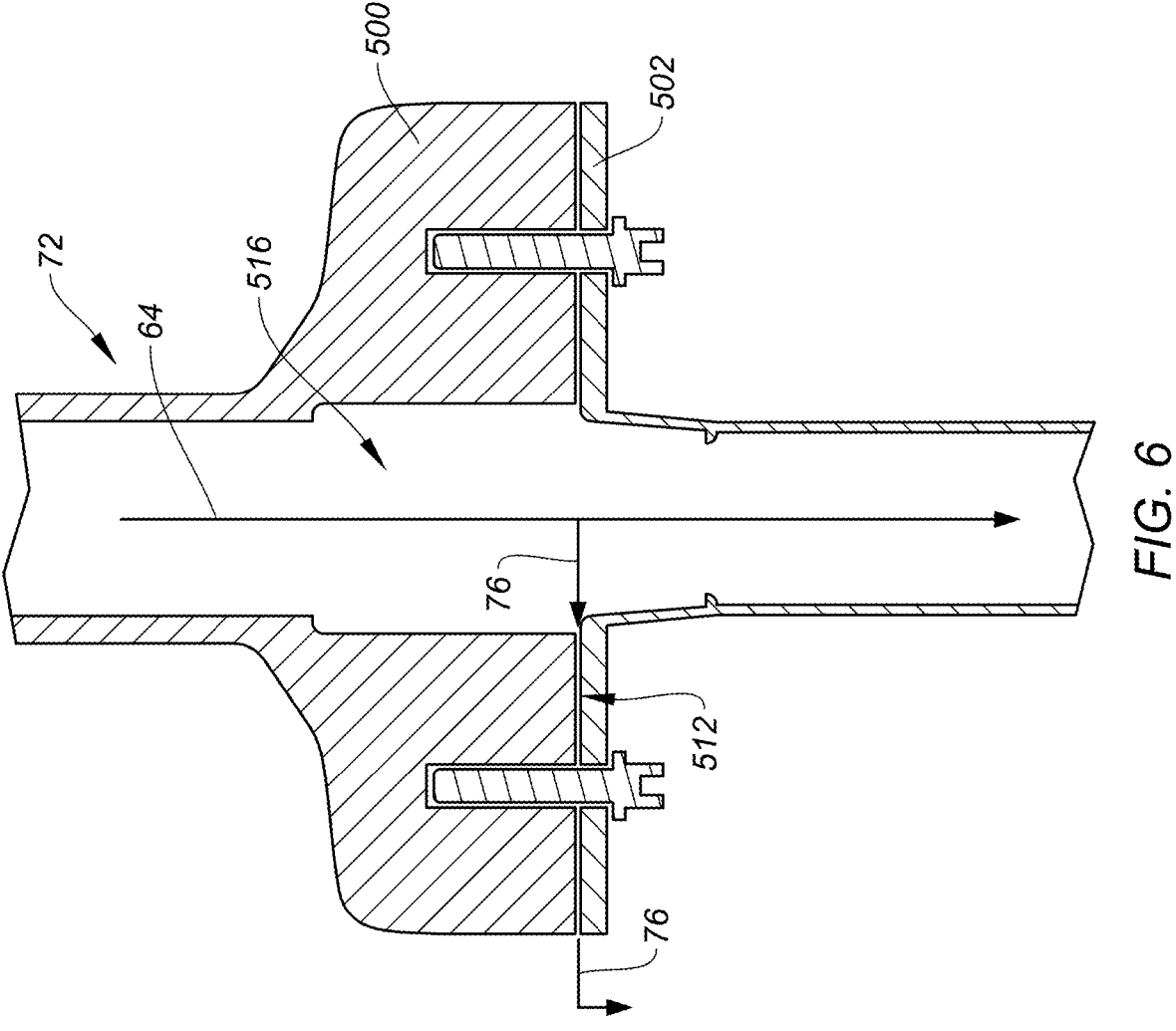
FIG. 6 illustrates a cutaway view of the engine oil system of FIG. 5 without the strainer assembly of FIG. 5 installed, in accordance with one or more embodiments of the present disclosure.

The engine oil system 34 of the present disclosure and its conduit 72 and strainer assembly 74 configuration facilitates identification of an improperly installed or mistakenly uninstalled strainer assembly 74 without the need to disassemble components of the engine oil system 34. For example, as shown in FIG. 6, in the absence of the strainer assembly 74 (see FIG. 5), the flange interface 512 is placed in fluid communication with the internal passage 516. As a result, some amount of oil flowing along the oil flow path 64 will leak through the flange interface 512 along an oil leakage path 76 to an exterior of the conduit 72. This oil leakage at the exterior of the conduit 72 will be readily observable to a technician inspecting the flange interface 512, thereby providing a visual indication of the improperly installed or mistakenly uninstalled strainer assembly 74 in the conduit 72. For relatively high-pressure embodiments of the engine oil system 34, an unsealed configuration (e.g., the flange interface 512 does not include a gasket, resilient seal, or other sealing body between the first conduit body 500 and the second conduit body 502) of the flange interface 512 may be sufficient to facilitate at least some oil leakage through the flange interface 512 along the oil leakage path 76 during operation of the engine oil system 34. For relatively lower-pressure embodiments of the engine oil system 34, the first conduit body 500 and/or the second conduit body 502 may form a hole or a recess at the flange interface 512 to facilitate at least some oil leakage through the flange interface 512 along the oil leakage path 76 during operation of the engine oil system 34.

Figure 7:
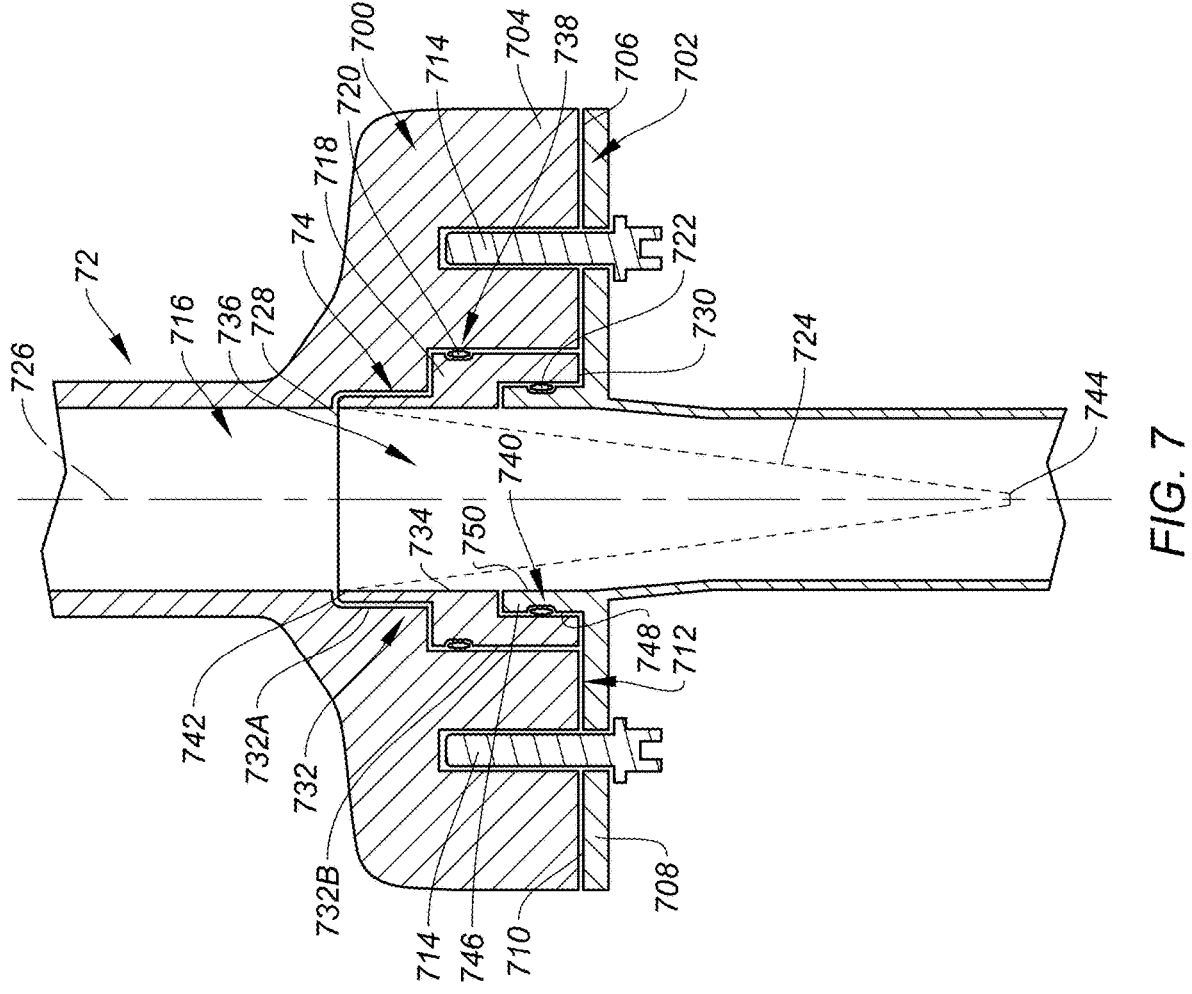
FIG. 7 illustrates a cutaway view of the engine oil system and another strainer assembly, in accordance with one or more embodiments of the present disclosure.

FIG. 7 illustrates a cutaway view of another embodiment of the strainer assembly 74 installed in the conduit 72. The conduit 72 of FIG. 7 includes a first conduit body 700 (e.g., a pipe) and a second conduit body 702 (e.g., a pipe). The first conduit body 700 of FIG. 7 includes a flange portion 704 at (e.g., on, adjacent, or proximate) an end 706 (e.g., a distal end) of the first conduit body 700. The second conduit body 702 of FIG. 7 includes a flange portion 708 at (e.g., on, adjacent, or proximate) an end 710 (e.g., a distal end) of the second conduit body 702. The first conduit body 700 (e.g., the flange portion 704) is mounted to the second conduit body 702 (e.g., the flange portion 508) along a flange interface 712, for example, by a plurality of mechanical fasteners 714. The first conduit body 700 and the second conduit body 702 form an internal passage 716 of the conduit 72 through which oil may flow along the oil flow path 64 in a direction from the first conduit body 700 to the second conduit body 702. The strainer assembly 74 of FIG. 7 is mounted within the first conduit body 700 at (e.g., on, adjacent, or proximate) the flange interface 712. The strainer assembly 74 of FIG. 7 includes a tubular body 718, a first packing ring 720, a second packing ring 722, and a strainer member 724 arranged along an axis 726 (e.g., a centerline axis) of the strainer assembly 74 of FIG. 7.

The tubular body 718 extends circumferentially about (e.g., completely around) the axis 726. The tubular body 718 extends (e.g., axially extends) between and to a first axial end 728 of the tubular body 718 and a second axial end 730 of the tubular body 718. The second axial end 730 is disposed at (e.g., on, adjacent, or proximate) the flange interface 712. The tubular body 718 extends (e.g., radially extends) between and to an outer radial side 732 of the tubular body 718 and an inner radial side 734 of the tubular body 718. The outer radial side 732 includes a first axial portion 732A and a second axial portion 732B. The first axial portion 732A is disposed at (e.g., on, adjacent, or proximate) the first axial end 728. The second axial portion 732B is disposed at (e.g., on, adjacent, or proximate) the second axial end 730. The second axial portion 732A is disposed radially outward of the first axial portion 732A. The tubular body 718 is disposed (e.g., entirely disposed) within the first conduit body 500. The inner radial side 734 forms and circumscribes a strainer passage 736 of the tubular body 718 for a portion of an axial span of the tubular body 718. The strainer passage 736 forms a portion of the internal passage 716. Accordingly, oil along the oil flow path 64 flows through the internal passage 716 from the first conduit body 700, through the tubular body 718 (e.g., the strainer passage 736), and into the second conduit body 702.

The first packing ring 720 extends circumferentially about (e.g., completely around) the axis 726. The first packing ring 720 is disposed on the outer radial side 732. For example, the first packing ring 720 of FIG. 7 is disposed on the second axial portion 732B; however, the present disclosure is not limited to this foregoing exemplary configuration of the strainer assembly 74 of FIG. 7. The first packing ring 720 of FIG. 7 is disposed within a packing groove 738 formed by the tubular body 718 on the outer radial side 732. The first packing ring 720 is disposed in contact with the first conduit body 700 to form a fluid seal between the tubular body 718 and the first conduit body 700 upstream of the flange interface 712.

The second packing ring 722 extends circumferentially about (e.g., completely around) the axis 726. The second packing ring 722 of FIG. 7 is disposed on the second conduit body 702. For example, the second packing ring 722 of FIG. 7 is disposed on a tubular extension 746 of the second conduit body 702. The tubular extension 746 extends axially outward from flange portion 708. The tubular extension 746 extends circumferentially about (e.g., completely around) the axis 726. The tubular extension 746 is disposed within (e.g., axially within) the first conduit body 500 and the tubular body 718. The tubular extension 746 extends (e.g., radially extends) between and to an outer radial side 748 of the tubular extension 746 and an inner radial side 750 of the tubular extension 746. The second packing ring 722 of FIG. 7 is disposed within a packing groove 740 formed by the tubular extension 746 on the outer radial side 748. The second packing ring 722 is disposed in contact with the second conduit body 702 on the inner radial side 734 to form a fluid seal between the tubular body 718 and the second conduit body 702. The inner radial side 750 further forms the internal passage 716. The first packing ring 720 and the second packing ring 722 collectively isolate the internal passage 716 from fluid communication with the flange interface 712. While the packing rings 720, 722 of FIG. 7 are disposed within the grooves 738, 740 formed by the tubular body 718 and the second conduit body 702, respectively, the first packing ring 720 may alternatively be disposed within the groove 738 formed by the first conduit body 700 and/or the second packing ring 722 may alternatively be disposed within the groove 740 formed by the tubular body 718.

The strainer member 724 extends circumferentially about (e.g., completely around) the axis 726. The strainer member 724 extends (e.g., axially extends) between and to a first axial end 742 of the strainer member 724 and a second axial end 744 of the strainer member 724. The strainer member 724 is mounted to the tubular body 718 at (e.g., on, adjacent, or proximate) the first axial end 742. For example, the first axial end 742 may be brazed to, welded to, or otherwise fixedly attached to the tubular body 718 on the inner radial side 734 (e.g., at the first axial end 728). The second axial end 744 is disposed downstream of the first axial end 742. For example, the second axial end 744 may be disposed within the second conduit body 702 and form a distal, downstream end of the strainer assembly 74. In some alternative embodiments, however, the second axial end 744 may be disposed upstream of the first axial end 742 (e.g., to accommodate space constraints within the conduit 72). The strainer member 724 may include a mesh or otherwise perforated strainer plate extending circumferentially about the axis 726 between and to the first axial end 742 and the second axial end 744. The strainer member 724 is configured to strain debris entrained in the oil (e.g., all or substantially all of the oil flowing through the internal passage 716) such that the debris is removed from the oil as the oil flows through the strainer 724 along the oil flow path 64. The strainer member 724 of FIG. 7 forms a conical body having a diameter which converges in a direction from the first axial end 742 toward the second axial end 744; however, the present disclosure is not limited to the foregoing exemplary configuration of the strainer member 724 of FIG. 7.

Similar to the strainer assembly 74 of FIGS. 5 and 6, in the absence of the strainer assembly 74 (e.g., the tubular body 718), the flange interface 712 is placed in fluid communication with the internal passage 716. As a result, some amount of oil flowing along the oil flow path 64 will leak through the flange interface 712 to an exterior of the conduit 72, thereby providing a visual indication of the improperly installed or mistakenly uninstalled strainer assembly 74 in the conduit 72.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An engine oil system for an aircraft engine, the engine oil system comprising:

a conduit forming a portion of an oil flow path through the engine oil system, the conduit including a first conduit body and a second conduit body, the first conduit body mounted to the second conduit body at a flange interface, the first conduit body and the second conduit body forming an internal passage of the conduit for the oil flow path; and a strainer assembly disposed within the conduit at the flange interface, the strainer assembly including a tubular body, a first packing ring, a second packing ring, and a strainer member, the tubular body further forming the internal passage, the first packing ring forming a first fluid seal between the tubular body and the first conduit body, the second packing ring forming a second fluid seal between the tubular body and the second conduit body, the first packing ring and the second packing ring isolating the flange interface from fluid communication with the internal passage, the strainer member mounted to the tubular body within the oil flow path.

2. The engine oil system of claim 1, further comprising an oil tank and an oil pump, and the conduit forms the portion of the oil flow path between the oil tank and the oil pump.

3. The engine oil system of claim 1, wherein the first conduit body includes a first flange portion, the second conduit body includes a second flange portion, and the first flange portion is mounted to the second flange portion to form the flange interface.

4. The engine oil system of claim 1, wherein the strainer member extends between and to a first strainer end and a second strainer end, the strainer member is mounted to the tubular body and the first strainer end, and the second strainer end is disposed within the second conduit body.

5. The engine oil system of claim 4, wherein the strainer member has a conical body having a diameter which converges in a direction from the first strainer end toward the second strainer end.

6. The engine oil system of claim 1, wherein the tubular body extends along an axis of the strainer assembly between and to a first axial end and a second axial end, the first axial end is disposed within the first conduit body, and the second axial end is disposed within the second conduit body.

7. The engine oil system of claim 6, wherein the tubular body forms the internal passage through the flange interface.

8. The engine oil system of claim 6, wherein the first packing ring is disposed at the first axial end.

9. The engine oil system of claim 6, wherein the second packing ring is disposed at the second axial end.

10. The engine oil system of claim 1, wherein the tubular body extends along an axis of the strainer assembly between and to a first axial end and a second axial end, the first axial end is disposed within the first conduit body, and the second axial end is disposed at the flange interface.

11. The engine oil system of claim 10, wherein the second conduit body includes a tubular extension disposed within the tubular body.

12. The engine oil system of claim 11, wherein the second packing ring forms the second fluid seal between the tubular body and the tubular extension.

13. An engine oil system for an aircraft engine, the engine oil system comprising:

a conduit forming a portion of an oil flow path through the engine oil system, the conduit including a first conduit body and a second conduit body, the first conduit body mounted to the second conduit body at a flange interface, the first conduit body and the second conduit body forming an internal passage of the conduit for the oil flow path; and a strainer assembly disposed within the conduit at the flange interface, the strainer assembly including a tubular body, a first packing ring, a second packing ring, and a strainer member, the tubular body extending between and to a first axial end and a second axial end, the tubular body further forming the internal passage between the first axial end and the second axial end, the first axial end disposed within the first conduit body, the second axial end disposed at the second conduit body, the first packing ring and the second packing ring disposed at the tubular body and isolating the flange interface from fluid communication with the internal passage, the strainer member mounted to the tubular body within the oil flow path.

14. The engine oil system of claim 13, wherein the first conduit body includes a first flange portion, the second conduit body includes a second flange portion, and the first flange portion is mounted to the second flange portion to form the flange interface between the first flange portion and the second flange portion.

15. The engine oil system of claim 13, wherein the first packing ring forms a first fluid seal between the tubular body and the first conduit body.

16. The engine oil system of claim 13, wherein the second packing ring forms a second fluid seal between the tubular body and the second conduit body.

17. The engine oil system of claim 16, wherein the tubular body is disposed radially inward of the second packing ring and the second conduit body is disposed radially outward of the second packing ring.

18. The engine oil system of claim 16, wherein the tubular body is disposed radially outward of the second packing ring and the second conduit body is disposed radially inward of the second packing ring.

19. The engine oil system of claim 13, wherein the strainer member extends between and to a first strainer end and a second strainer end, the strainer member is mounted to the tubular body and the first strainer end, and the second strainer end is disposed within the second conduit body.

20. The engine oil system of claim 19, wherein the strainer member has a conical body having a diameter which converges in a direction from the first strainer end toward the second strainer end.

\* \* \* \* \*